Figure 1:
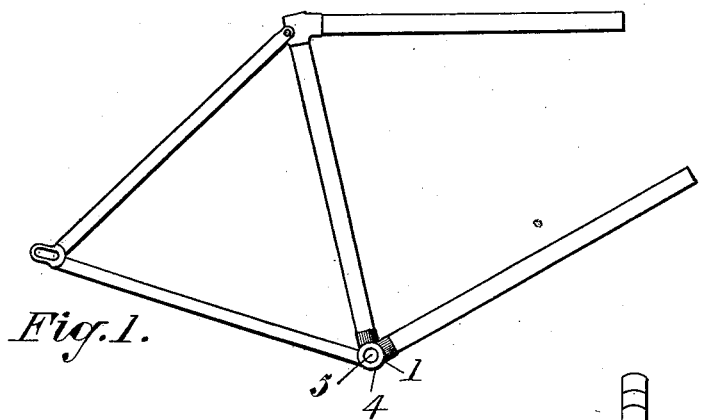

(No Model.) 2 Sheets—Sheet 1.

T. FANE & C. F. LAVENDER.
VELOCIPEDE.

No. 507,114. Patented Oct. 24, 1893.

Witnesses,
C. L. Lawrie.
M. E. Angell.

Inventors
Thomas Fane
Charles F. Lavender
by Charles H. Ricks
their attty.

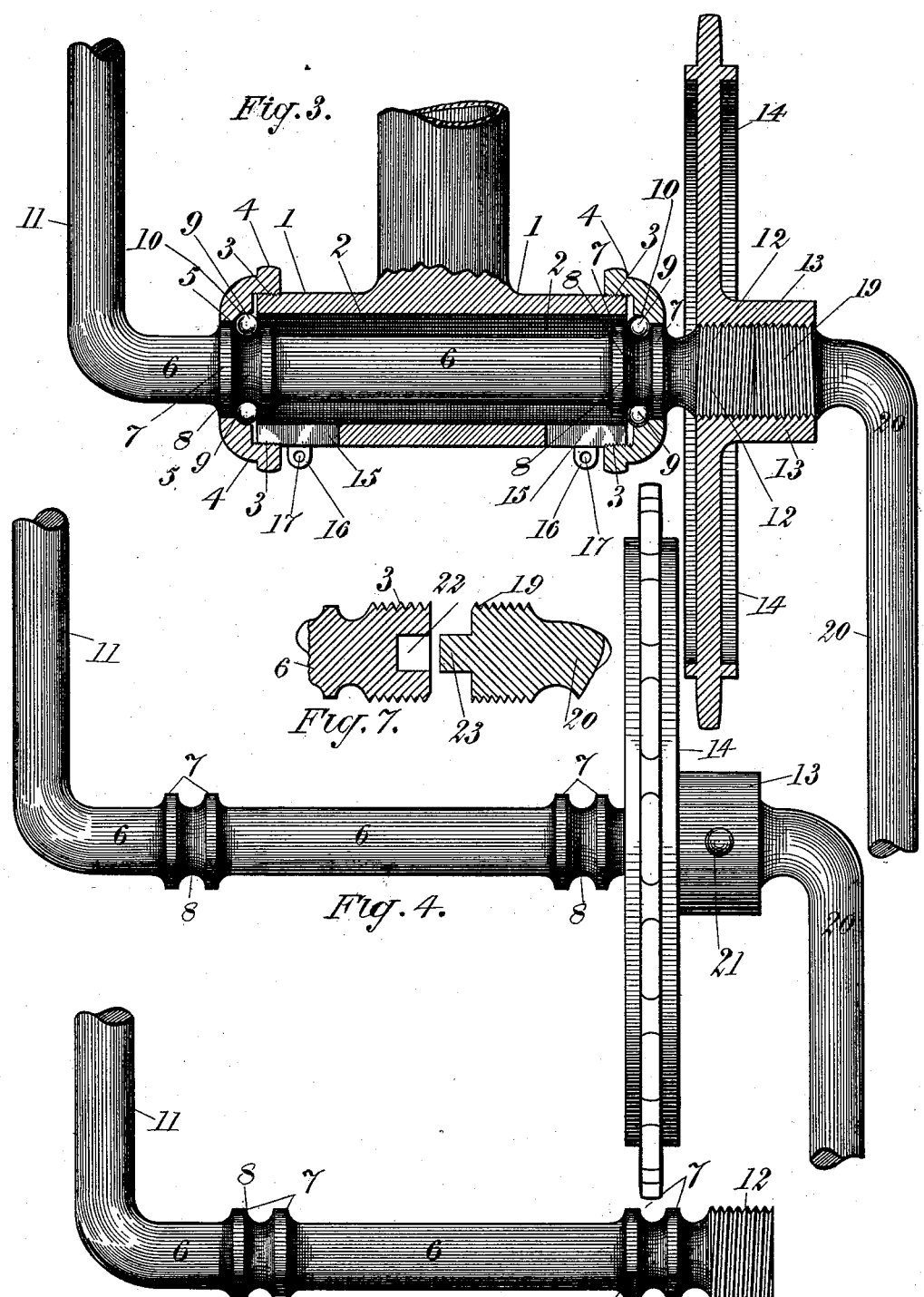

UNITED STATES PATENT OFFICE.

THOMAS FANE AND CHARLES F. LAVENDER, OF TORONTO, CANADA.

VELOCIPEDE.

SPECIFICATION forming part of Letters Patent No. 507,114, dated October 24, 1893.

Application filed June 20, 1892. Serial No. 437,392. (No model.)

*To all whom it may concern:*

Be it known that we, THOMAS FANE and CHARLES F. LAVENDER, manufacturers, both residing in the city of Toronto, in the county of York, in the Province of Ontario, Canada, have invented certain new and useful Improvements in Velocipedes; and we hereby declare the following to be a full, clear, and exact description of the same.

Heretofore in those velocipedes provided with ball bearings the parts constituting what are familiarly known as the crank axle and crank axle bracket consisted respectively of a circular piece of metal serving as a crank axle on which two cones were screwed and a bearing box having a passage way formed therethrough to receive the crank axle. The cones were so constructed as to serve not only as a surface upon which the balls ran but also as caps to close either end of the crank axle bracket. Owing to the necessity of frequently adjusting these cones it was never possible to make a perfectly tight joint between the flange of the cone (which serves as an end cap) and the adjacent end of the crank axle bracket. During the transit of the machine dust accumulated in the space intervening between the said end cap and the end of the crank axle bracket and this dust in time became worked into the bearing box with the result that the bearings were destroyed through the cutting action of the dust upon the several parts and the power necessary for driving the machine was required to be greatly increased.

The principal object which we have in view is the reduction of the weight of the machine and the necessary power required to drive the same, combining at the same time with this reduction of weight an increase in the strength and life of the several parts, and also to so construct the parts constituting the crank and crank axle bracket that no resting surface will be presented for the dust to accumulate upon and work into the bearings of the machine and the invention consists essentially of a crank axle bracket having a passage way therethrough to receive the crank axle; an end cap fitting over and tightly closing either end of the crank axle bracket; a circular opening formed in each of these end caps the center of which is diametrically opposite the center of the circular passage way through the crank axle bracket to allow the crank axle to pass therethrough, the circular opening in the end caps being only sufficiently larger in diameter than that part of the crank axle which it encircles to permit the crank axle to freely revolve, two cones formed on the crank axle one at either end of the crank axle bracket and within the said end caps; the crank axle and one of the cranks being formed of one continuous piece of metal; the said crank at the outer side of the adjacent end cap being bent at right angles to the crank axle while on the end of the crank axle is cut a left screw thread; screwed upon this end of the crank axle is the chain wheel one portion of the inner face of the hub of which has a right screw thread cut upon it and the remaining portion of the inner face of the said hub has a left screw thread cut upon it; the second crank has a right screw thread cut upon it and screwed into the right threaded portion of the hub of the chain wheel; a counter pin passes through the hub of the chain wheel, the end of the crank axle and the said second crank; the whole device being constructed as hereinafter more fully set forth in the specification and more particularly pointed out in the claim.

Figure 2:
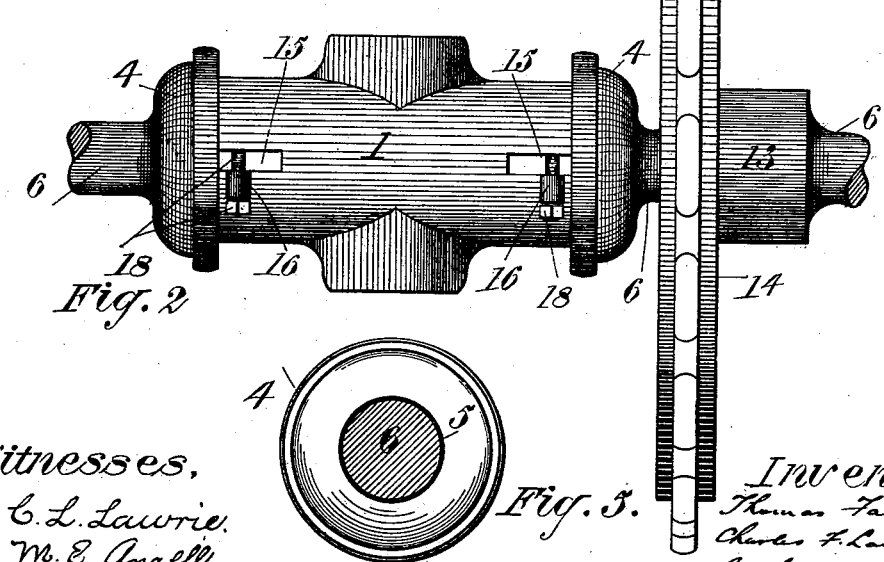
Figure 3:
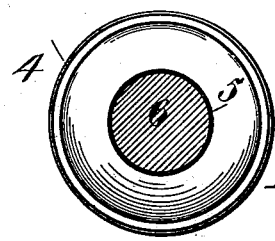

In the drawings: Figure 1 is a side elevation of a portion of a bicycle frame showing the location of the crank axle bracket. Fig. 2 is a full sized view of the under side of the crank axle bracket, the end caps, the crank axle and the chain wheel. Fig. 3 is a cross sectional view of the crank axle bracket, the end caps and the chain wheel showing the chain wheel, the crank axle, the cranks, the bearings, the end caps and the crank axle bracket. Fig. 4 is a view of the cranks, crank axle and chain wheel. Fig. 5 is an end view of one of the end caps. Fig. 6 is a view of the crank and crank axle. Fig. 7 is a sectional view of an alternative form of end for the crank axle and crank.

Like numerals of reference refer to like parts throughout the specification and drawings.

The crank axle bracket consists of a body 1, having a circular passage way 2 formed therethrough. The outer surface of each end of the crank axle bracket 1 has formed upon it a screw thread 3. Screwed upon each end of the crank axle bracket 1 is a cap 4 having a circular opening 5. The centers of the circular openings 5 are diametrically opposite each other and opposite the center of the circular passage 2.

Passing through the openings 5 and the passage 2 is the crank axle 6 having formed upon it two enlargements 7 located one at either end of the crank axle bracket 1. Each of these enlargements 7 consists of an enlargement preferably formed integral with the crank axle 6. Formed in the said enlargement 6 is a groove or channel 8 in which run the ball bearings 9.

By reference to the various figures of the drawings it will be noticed that the circular opening 5 in each of the end caps 4 is but slightly larger in diameter than that portion of the crank axle 6 which it encircles, to permit of the free revolution of the crank axle.

On the inner face of the cap 4 is a hardened concave surface 10 upon which run the ball bearings 9 while traveling in the groove 8 of the bearings 7. It might here be stated that the groove 8 in the enlargements 7 and the concaved surface 10 on the inner face of the cap 8 are both sufficiently hardened to prevent wear and friction.

The crank 11 and crank axle 6 are made of one continuous piece of metal and are preferably constructed as follows:—A piece of suitable metal of the requisite length and thickness is procured and upon this metal is formed two enlargements 7. Formed in each of the enlargements 7 is a groove or channel 8 in which work the ball bearings 9. One of the enlargements 7 on the crank axle 6 is preferably formed at or near one end of that portion of the bar that is to be the crank axle 6 while the second enlargement 7 is formed on the crank axle 6 at a suitable distance from the first enlargement 7. Upon the surface of the bar at that end adjacent to the enlargements 7 is cut a left screw thread 12 to agree with a corresponding screw thread cut in the inner face of the hub 13 of the chain wheel 14. The metallic bar is then bent to form the crank 11 which crank will be located on the outer side of the end cap 4 when the end cap is screwed on the crank axle bracket 1.

Again by reference to Fig. 3 of the drawings it will be noticed that each of the enlargements 7 and the grooves 8 are within the cap 4 and crank axle bracket 1, and that the cap 4 encircles the crank axle 6 so snugly that there is only sufficient clearance between the two to permit of the free revolution of the crank axle. The dust falling upon the crank axle 6 will be shaken off during the rotation of the wheel and consequently cannot be worked into the bearings. It will also be noticed by reference to Fig. 3 of the drawings that the screw threaded end 12 of the crank axle 6 projects beyond its adjacent end cap 4 a sufficient distance to receive the hub 13 of the chain wheel 14 and allows sufficient clearance between the hub 13 and end cap 4 to prevent the chain wheel 14 striking against or interfering with the said end cap 4.

It might here be stated that the end caps 4 are stationary upon the ends of the crank axle bracket 1 and are locked in position by the spreading asunder of the ends of the crank axle bracket 1 so that under no circumstances can the said end caps rotate with the axle 6 or otherwise alter their position until the ends of the crank axle bracket have been contracted again.

By constructing the crank and crank axle of one continuous piece of metal and forming the bearings integral with the crank axle a large number of the parts heretofore used can be entirely dispensed with, thus simplifying the construction of the machine, reducing its weight and the cost of manufacture. Another great advantage in making the crank and crank axle of one continuous piece of metal is being able to dispense with the necessity of separating the two parts when it is necessary to take the machine to pieces for cleaning or repairing purposes. By forming the bearings integral with the crank axle and placing them within the end caps and axle bracket the bearings are rendered almost dust proof as no resting surface is presented for the dust to fall and accumulate upon and work into the bearings. Another great advantage to be derived from a construction of this kind is the fact that the end caps 4 can be more readily adjusted than the cones heretofore used which were screwed upon the crank axle, and these end caps once adjusted can be securely locked in position and prevented from altering their adjustment.

Formed in each end of the under side of the crank axle bracket 1 is a saw cut or slit 15 and formed in the under side of the crank axle bracket 1 and adjacent to one edge of each of these slits 15 is a lug 16 having a screw threaded hole 17 formed therethrough. This screw threaded hole 17 is preferably inclined so that the screw 18 passing through it will bear against the opposite end of the slit 15 and when force is applied to the said screw the said screw will move the edges of the said slit from each other thus expanding and binding the ends of the crank axle bracket 1 tightly against the inner faces of the end caps 4.

The hub 13 of the chain wheel 14 is screw-threaded to engage with the left screw thread 12 cut on the end of the crank axle 6 and is also screw threaded to engage with the right screw thread 19 cut on the end of the crank 20.

We may if we find it convenient pass through the hub 13 the screw threaded end 12 of the crank axle 6 and the screw threaded end 19 of the crank 20 a counter pin 21 to prevent any one of the parts revolving without the others. We may also if we find it convenient in place of screw threading the end of the crank axle 6 and the end of the crank axle 20, form a rectangular shaped shoulder upon these ends and a correspondingly shaped opening through the hub 13 of the chain wheel 14 and pass a counter pin through the hub 13 and the said rectangular shaped ends. This construction would accomplish the same results as that accomplished by screw threading the several parts.

In Fig. 7 of the drawings we have shown an alternative form of construction for the adjacent end of the crank axle 6 and the adjacent end 19 of the crank axle 20. This consists of forming in the end of the crank axle 6 a rectangular shaped opening 22 into which enters the rectangular shaped projection 23 of the crank 20. The end of the crank 19 and the end of the axle 12 are screw threaded in the manner herein before described and are put together in the manner following, that is to say, the screw threaded portions of each of these respective parts are simultaneously brought into engagement with the screw thread cut in the hub 13 of the chain wheel 14. The chain wheel 14 is then caused to rotate until the screw threaded portion of the hub 13 has been threaded upon the screw threaded portions respectively of the axle 6 and crank 20. The rotation of the chain wheel 14 draws together the ends respectively of the crank axle 6 and crank 20 and eventually the projection 23 enters the opening 22 and binds the crank axle 6 to the said crank 20.

Having thus fully described our invention, what we claim as new, and desire to secure by Letters Patent, is—

In a velocipede the combination of the crank axle bracket having a passage formed therethrough at right angles to the line of advance of the machine with an end cap fitting tightly over and closing each end of the passage a circular opening formed through each end cap, the crank axle located in the said passage and extending through the openings in the end cap, two bearing surfaces fitted to the crank axle bearing surfaces on the inner face of each end cap to correspond with the bearing surfaces on the crank axle one end of the crank axle screw threaded and a recess formed in the said screw threaded end, a crank formed on the other end of the crank axle and at the outer side of the end caps, said crank and crank axle made of one continuous piece of metal, the chain wheel, one-half of the hub of which is fitted to receive the end of the crank axle the other end fitted to receive the end of the second crank, the second crank having a projection to enter the recess in the crank axle and screw threaded in the opposite direction to the screw thread of the crank axle, substantially as described.

Toronto, May 21, 1892.

THOMAS FANE.
CHARLES F. LAVENDER.

In presence of—
CHARLES H. RICHER,
M. E. ANGELL.